Jan. 20, 1970 F. DE JAGER ET AL 3,491,298

TIME MARKING FLUCTUATION AND ERROR REDUCTION BY CODE CONVERSION AT PULSE TRANSMITTER, REPEATER AND RECEIVER STATIONS

Filed Oct. 31, 1966 6 Sheets-Sheet 1

FRANK DE JAGER INVENTORS
LEO E. ZEGERS
JAN KUILMAN
BY
AGENT

Jan. 20, 1970 F. DE JAGER ET AL 3,491,298
TIME MARKING FLUCTUATION AND ERROR REDUCTION BY CODE
CONVERSION AT PULSE TRANSMITTER, REPEATER
AND RECEIVER STATIONS
Filed Oct. 31, 1966 6 Sheets-Sheet 2

FRANK DE JAGER
LEO E. ZEGERS
JAN KUILMAN INVENTORS
BY
AGENT

Jan. 20, 1970 F. DE JAGER ET AL 3,491,298

TIME MARKING FLUCTUATION AND ERROR REDUCTION BY CODE CONVERSION AT PULSE TRANSMITTER, REPEATER AND RECEIVER STATIONS

Filed Oct. 31, 1966 6 Sheets-Sheet 3

FRANK DE JAGER
LEO E. ZEGERS
JAN KUILMAN INVENTORS
BY
AGENT

INVENTORS
FRANK DE JAGER
LEO E. ZEGERS
JAN RUILMAN
BY
Frank R. Trifari
AGENT

Jan. 20, 1970 F. DE JAGER ET AL 3,491,298

TIME MARKING FLUCTUATION AND ERROR REDUCTION BY CODE CONVERSION AT PULSE TRANSMITTER, REPEATER AND RECEIVER STATIONS

Filed Oct. 31, 1966 6 Sheets-Sheet 5

INVENTORS
FRANK DE JAGER
LEO E. ZEGERS
JAN KUILMAN
BY

AGENT

TIME MARKING FLUCTUATION AND ERROR REDUCTION BY CODE CONVERSION AT PULSE TRANSMITTER, REPEATER AND RECEIVER STATIONS

Filed Oct. 31, 1966 6 Sheets-Sheet 6

FRANK DE JAGER
LEO E. ZEGERS
JAN KUILMAN
INVENTORS
BY
AGENT

United States Patent Office 3,491,298

Patented Jan. 20, 1970

3,491,298

TIME MARKING FLUCTUATION AND ERROR REDUCTION BY CODE CONVERSION AT PULSE TRANSMITTER, REPEATER AND RECEIVER STATIONS

Frank de Jager, Leo Eduard Zegers, and Jan Kuilman, Emmasingel, Eindhoven, Netherlands, assignors, by mesne assignments, to U.S. Philips Corporation, New York, N.Y., a corporation of Delaware Filed Oct. 31, 1966, Ser. No. 590,943

Claims priority, application Netherlands, Nov. 2, 1965, 6514161

Int. Cl. H04b 7/18

U.S. Cl. 325—13 10 Claims

ABSTRACT OF THE DISCLOSURE

A pulse transmission system has intermediate stations between the transmitter and receiver. The intermediate stations convert the codes they receive, and the receiver has means for reconverting the signals to the original code. The system reduces time-marking fluctuations. The code converters have modulo 2 adders and time delay networks.

The invention relates to a transmission system for the transmission of information by means of pulse signals in which the pulses occur only at instants marked by a fixed clock frequency, the system comprising two terminal stations formed by a transmitting station and a receiving station, respectively, and a number of intermediate repeater stations with pulse regenerators which are located in the transmission path and are controlled by means of the fixed clock frequency regained from the incoming signal. The fixed clock frequency may be derived, for example, both from the signal characters and from a pilot signal co-transmitted with the signal characters. In practice such transmission systems are advantageously used for the transmission of information by means of pulse code modulation, synchronous telegraphy, teleprinting and the like.

In practice special difficulties are encountered in such a transmission system as a result of the occurrence of the signal pulses received in the receiving station at instants which show fluctuations with respect to the instants marked in the transmitting station by the fixed clock frequency. These time-marking fluctuations ("jitter") result from imperfections in the transmission system, for example, the presence of noise, variations in the component parts, mutual interference of signal characters, amplitude-to-phase conversion, and the like. In particular in long transmission systems, in which a great number of intermediate repeater stations is incorporated, the time-marking fluctuations may have a large effective value, which increases according as the number of intermediate repeater stations increases.

It is the object of the invention to produce in a simple manner a considerable reduction of the effective value of the time-marking fluctuations in a transmission system of the type described, in particular in transmission systems of a large length.

The transmission system according to the invention is characterized in that in at least one intermediate repeater station a code converter is included which converts an ingoing pulse pattern into a different outgoing pulse pattern.

In order that the invention may readily be carried into effect, certain embodiments thereof will now be described in greater detail, by way of example, with reference to the accompanying figures in which:

FIGURE 1 shows a transmission system according to the invention, and

FIGURE 2 a pulse regenerator included in said system;

Figures 1, 2, 4:
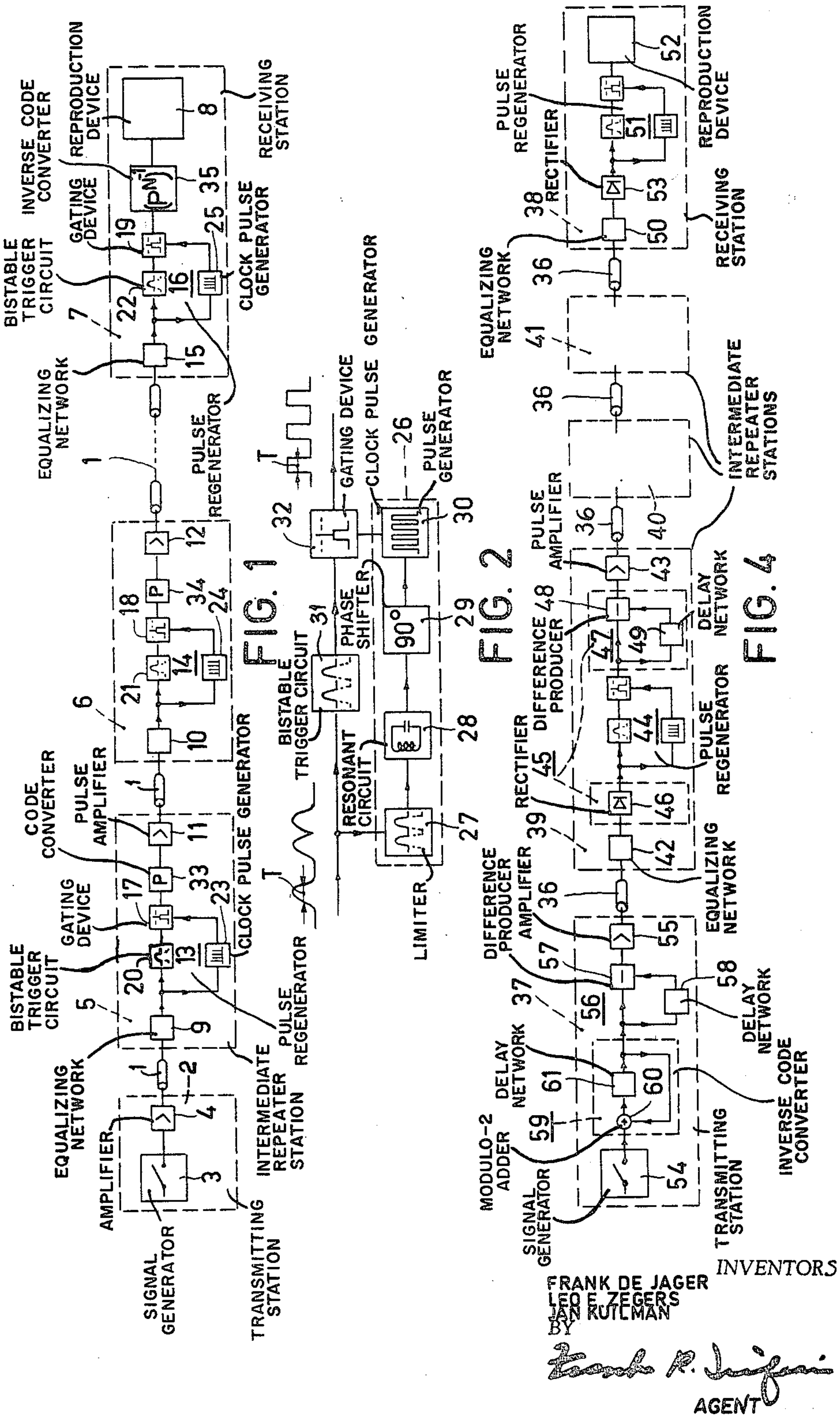
FIGURE 4 shows an embodiment of a transmission system according to the invention in greater detail, while for explanation the associated time diagrams are shown in FIGURES 5 and 6.

FIGURE 1 shows a transmission system according to the invention for the transmission of information through a transmission path in the form of a cable 1 by means of pulse signals, in which the pulses occur only at instants marked by a fixed clock frequency, for example, by pulse code modulation with unipolar pulses. The pulse signals produced by a transmitting station 2 which is provided with a signal generator 3 and an output amplifier 4 are supplied, through intermediate repeater stations 5, 6, . . . arranged at regular distances in the cable 1, to a receiving station 7 including a reproduction device 8.

The intermediate repeater stations 5, 6, . . . comprise an equalizing network 9, 10, . . . for equalizing amplitude and phase characteristics of the preceding cable section, a pulse amplifier 11, 12, . . . and also a pulse regenerator 13, 14, . . . to regenerate the signal pulses according to form and instant of occurrence, while an equalizing network 15 and a pulse regenerator 16 are included at the input of the receiving station 7.

The pulse regenerators 13, 14, . . ., 16 in the intermediate repeater stations 5, 6, . . . and in the receiving station 7 are all of the same construction and each comprise a gating device 17, 18, . . ., 19 which is connected at one end, through a bistable trigger circuit 20, 21, . . . 22, to the output of the equalizing network 9, 10, . . ., 15 and, at the other end, is controlled by a clock pulse generator 23, 24, . . ., 25 which is likewise connected to said output, the clock-pulse generator 23, 24, . . ., 25 producing a series of equidistant clock pulses by means of the fixed clock frequency regained from the incoming signal.

The pulse regenerator is shown in greater detail in FIGURE 2. As shown in this figure, the clock pulse generator 26 is constituted by a limiter 27 which passes only the peaks of the incoming signal pulses, succeeded by a resonance circuit 28 tuned to the clock frequency and a 90° phase shifting network 29 the output voltage of which synchronizes a pulse generator 30 of clock frequency. Each time when a signal pulse is received, the bistable trigger 31 flips over at the nominal half amplitude value and thus produces rectangular pulses at its output which, as the clock pulses produced in the clock pulse generator 26, are applied to the gating device 32. The gating device 32 is opened only when an output signal of the bistable trigger circuit 31 of positive polarity and a clock pulse from the pulse generator 30 are present simultaneously. In this manner a series of outgoing signal pulses corresponding to the incoming signal pulses appears at the output of the pulse regenerator which pulses are regenerated according to shape and instant of occurrence as is shown for explanation in FIG. 2 by the curves at the input and the output of the pulse regenerator.

In spite of this pulse regeneration according to shape and instant of occurrence in the intermediate repeater stations 5, 6, . . . and in the receiving station 7, the signal pulses at the output of the pulse regenerator 16 in the receiving station 7 appear to occur at instants which fluctuate about the instants marked by the fixed clock frequency in the transmitting station 2. It has been found that, in particular in systems having a large number of intermediate repeater stations in the transmission path, said time-marking fluctuations increase to very high effective values which are not permisible for various systems.

The invention produces a considerable reduction of the effective value of the time-marking fluctuations in that in the intermediate repeater station 5, 6 . . . a code converter 33, 34, . . . is included which converts an ingoing pulse pattern into a different outgoing pulse pattern.

Thus, in the various repeater stations 5, 6, . . . each time a different pulse pattern is handled as a result of the code conversion instead of the same pulse pattern, and the original pulse pattern produced by the signal generator 3 in the transmitting station 2 is not regained until in the receiver station 7 by means of an inverse code converter 35. If, for example, the pulse pattern experiences, in each intermediate repeater station 5, 6 . . ., a transformation indicated by P as a result of the code conversion and if N intermediate repeater stations 5, 6, . . . are present in the transmission path, said pulse pattern, on being received in the receiving station 7, has experienced a transformation denoted by $P^N$ as a result of the N code conversions. For regaining the original pulse pattern produced by the signal generator 3 in the transmitting station 2, an inverse transformation denoted by $(P^N)^{-1}$ is required in the receiving station 7 which transformation is effected by the inverse code converter 35.

The invention will now be described in greater detail.

In each of the intermediate repeater stations 5, 6, . . . time-marking fluctuations occur as a result of various causes and each of the said intermediate repeater stations 5, 6, . . . gives a contribution to the ultimate time marking fluctuations in the receiving station 7. Each of these contributions is given by the time marking fluctuations caused in the relative intermediate repeater station 5, 6, . . . multiplied by their transmission factor of the relative intermediate amplifier station 5, 6, . . . to the receiving station 7, which transmission factor is substantially determined by the tuned resonance circuits in the clock pulse generators of the intermediate repeater stations 6, . . . which succeed the relative intermediate repeater station 5, 6, . . . By combining said contributions of all the intermediate repeater stations 5, 6, . . . the ultimate time-marking fluctuations in the receiving station 7 are obtained.

It has been found that, in particular in transmission systems having a large number of intermediate repeater stations 5, 6, . . . of all the causes which give a contribution at a given instant to the ultimate time-marking fluctuation in the occurrence of a signal pulse in the receiving station 7, the causes which are associated with the pulse pattern preceding said instant are most important since, in fact, the clock pulses are derived from the pulses of the said preceding pulse pattern for time marking in the various intermediate repeater stations 5, 6, . . . Without code conversion in the intermediate repeater stations each time the same pulse pattern is handled in each intermediate repeater station 5, 6, . . . and consequently also the time-marking fluctuation which is caused in each intermediate repeater station 5, 6, . . . is equal in value and direction at every instant, the ultimate time-marking fluctuation being formed in the receiving station 7 by combination in the above described manner. It has been proved mathematically that in the transmission of a random pulse pattern through a transmission system having any arbitrary number of intermediate repeater stations N, the effective value of the ultimate time-marking fluctuations is substantially proportional to $\sqrt{N}$.

The situation becomes quite different when using the measures according to the invention. Whereas, in fact, in the known transmission system without code conversion always the same pulse pattern is presented to the successive intermediate repeater stations 5, 6, . . ., the situation in the transmission system according to the invention is such that as a result of the code conversions used in this case, each time a different pulse pattern is handled in the successive intermediate repeater stations 5, 6, . . ., as a result of which at every instant the time-marking fluctuation caused in the intermediate repeater stations 5, 6, . . ., is different both as regards value and direction for each intermediate repeater station 5, 6, . . . Thus, by using the measures according to the invention, the systematic character of the contributions of the successive intermediate repeater stations 5, 6, . . . to the ultimate time-marking fluctuations in the receiving station 7 is completely converted into a character which is comparable with noise, which results in a considerable reduction in the ultimate time-marking fluctuations, it having been proved mathematically that the effective value in this case in the transmission of a random pulse pattern through a transmission system having any arbitrary number of intermediate repeater stations N, is substantially proportional to $$\sqrt[4]{N}$$

Figure 3:
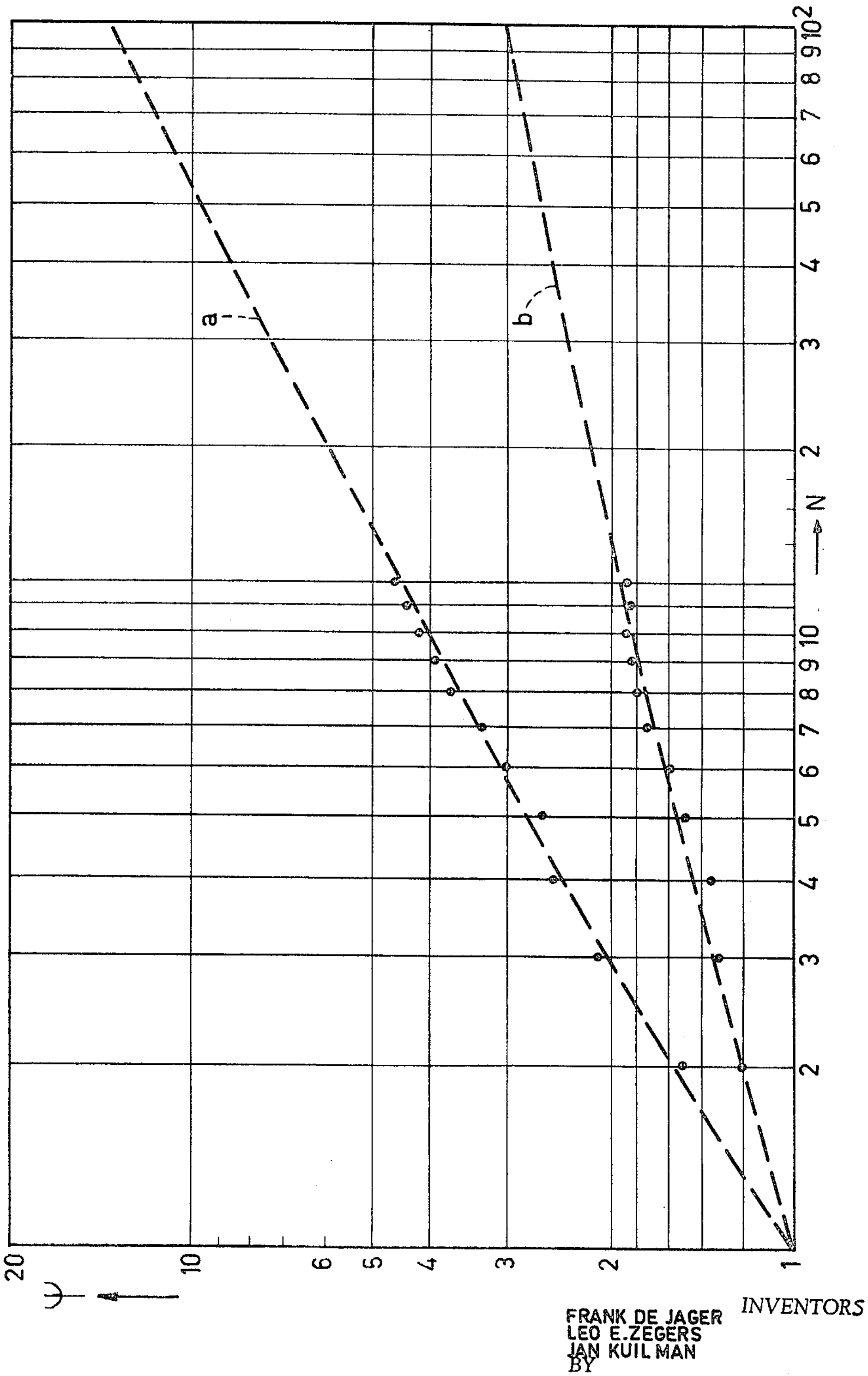
FIGURE 3 is a diagram to explain the effect achieved by the measures according to the invention.

Experimentally the above-described considerations are fully confirmed, as may appear also from the diagram shown in FIG. 3, in which the effective value $\psi$ of the ultimate time-marking fluctuation is plotted along the vertical axis and the number of intermediate repeater stations N is plotted along the horizontal axis, both on a logarithmic scale. In this figure, the curves *a* and *b* denote the mathematically computed effective values $\psi$ of the time-marking fluctuations dependent upon the number of intermediate repeater stations N for the known transmission system without code conversion, and the transmission system according to the invention, respectively, while the values of $\psi$, found in extensive experiments, as a function of N for both cases are denoted by measured points. Full agreement exists between the experimentally found values and the mathematically computed values.

FIG. 3 also shows the considerable reduction in the time-marking fluctuations realized by using the measures according to the invention. From this figure it appears, for example, that for a transmission system according to the invention having 100 intermediate repeater stations, the effective value of the time-marking fluctuations corresponds to that for a known transmission system having only 6 intermediate repeater stations.

In addition to the considerable reduction of the time-marking fluctuations, the transmission system according to the invention has the advantage of being realizable in a simple manner. For example, the code converters in the intermediate repeater stations cannot only be constructed with a minimum of elements, but in addition the code converters in the intermediate repeater stations are mutually of the same structure as will be explained in detail with reference to FIG. 4 and FIG. 8.

The transmission system shown in greater detail in FIG. 4 is constructed for the transmission of information by means of pulse code modulation in which the signal pulses in the transmission path have alternately positive and negative polarity, which pulses will hereinafter simply be termed bipolar pulses. From a transmission-technical point of view the use of the bipolar pulses has the advantage inter alia that no direct current need be transmitted.

To avoid complexity of the drawing only three mutually equal intermediate repeater stations 39, 40, 41 which, as regards structure corresponds to the intermediate repeater stations 5, 6, . . . shown in FIG. 1, are shown in the cable 36 of the transmission system shown in FIG. 4 which connects the transmitting station 37 to the receiving station 38. The first intermediate repeater station 39 shown in greater detail, comprises an equalizing network 42 for equalizing the amplitude and phase characteristics of the preceding cable section, a pulse amplifier 43 and a pulse regenerator 44 for regenerating signal pulses according to shape and instant of occurrence, which pulse regenerator 44 is constructed, for example, in the manner described with reference to FIG. 2, while in addition a code converter 45 is included which converts an ingoing pulse pattern into a different outgoing pulse pattern.

In the embodiment shown the code converter 45 in the first intermediate repeater station 39 comprises a full-wave rectifier device 46 which precedes the pulse regenerator 44 and a linear adding device 47 which succeeds the pulse regenerator 44 and is in the form of a linear difference producer 48 to which the rectified and regenerated signal pulses are on the one hand directly supplied and on the other hand through a delaying network 49 having a delay time of, for example, $T/2$, in which T represents the clock pulse period. As a delaying network shift register elements may be used advantageously.

In connection with the use of bipolar pulses in the transmission path, the receiving station 38 comprises—in addition to an equalizing network 50, a pulse regenerator 51, and a reproduction device 52—also a bipolar-unipolar converter in the form of a full-wave rectifier device 53, while the transmitting station 37 comprises, in addition to a signal generator 54 and an output amplifier 55, also a unipolar-bipolar converter 56 in the form of a linear difference producer 57 to which the unipolar pulses from the signal producer 54 are applied on the one hand directly and on the other hand through a delaying network 58 having a delay time of, for example, $T/2$.

The transmitting station 37 further comprises an inverse code converter 59 to be described hereinafter which transforms the pulse pattern produced by the signal generator 54 into such a pulse pattern that after all the following code conversions of this transformed pulse pattern, a pulse pattern is formed in the reproduction device 52 in the receiver station 38 which fully corresponds to the original pulse pattern produced by the signal generator 54 in the transmitting station 37.

The transformation of the pulse pattern produced by the code converter 45 in the first intermediate repeater station 39 of FIG. 4 will now be described with reference to the time diagrams shown in FIG. 5.

If, for example, in the transmitting station 37 a bipolar pulse pattern *a* is applied to the first cable section, a bipolar pulse pattern *b* will appear at the input of the full-wave rectifier device 46 under the influence of the transmission characteristics of the cable section and the equalizing network 42. By full-wave recitification of this bipolar pulse pattern *b* the unipolar pulse pattern *c* is obtained, which, after regeneration in the pulse regenerator 44, yields the unipolar pulse pattern *d*. Delay of the unipolar pulse pattern *d* in the delaying network 49 over a time $T/2$ gives the unipolar pulse pattern *e* and difference production of the two unipolar pulse patterns *d* and *e* in the linear difference producer 48 results in the bipolar pulse pattern *f* which, after amplification in the pulse amplifier 43 is applied to the second cable section.

Figure 5:
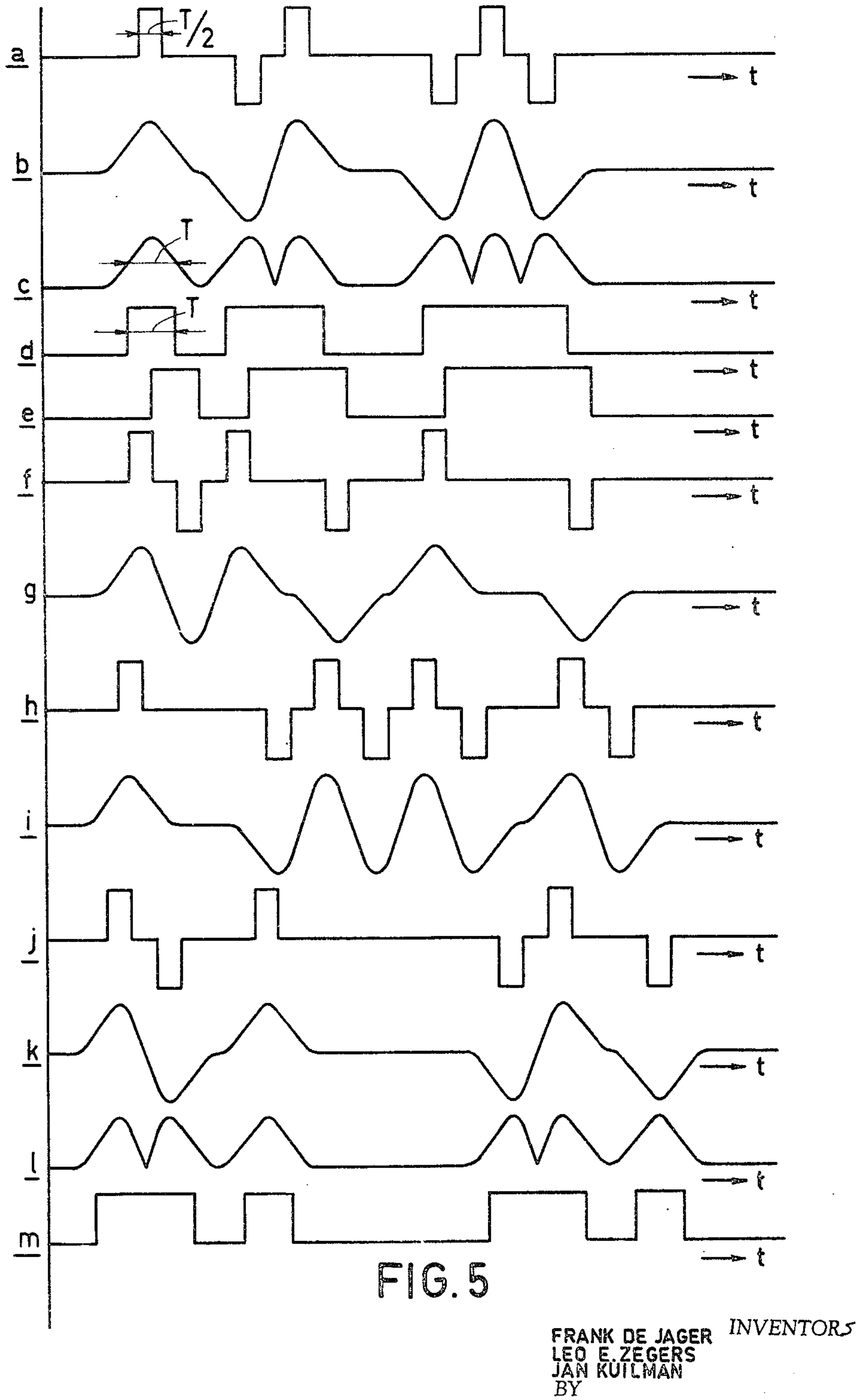

As may appear from the time diagrams shown in FIG. 5 a different outgoing pulse pattern *f* is obtained in the first intermediate repeater station 39, when supplying a pulse pattern *a* to the code converter 45.

Since the intermediate repeater station 39, 40, 41 are mutually equal, the transformations which the pulse pattern experiences by the code conversion in the second and third intermediate repeater stations 40, 41 will be quite analogous to the transformation which is effected by the code conversion in the first intermediate repeater station 39.

If now the bipolar pulse pattern *f* is applied to the second cable section by the first intermediate repeater station 39, a bipolar pulse pattern *g* appears at the input of the code converter in the second intermediate repeater station 40, from which latter pattern the bipolar pulse pattern *h* is formed by the code conversion, which is applied to the third cable section. Then a bipolar pattern *i* appears at the input of the code converter in the third intermediate repeater station 41, which pattern is converted by the code converter into the bipolar pulse pattern *j* which is applied to the fourth cable section.

A bipolar pulse pattern *k* then appears at the input of the bipolar-unipolar converter 53 in the receiving station 38 from which pattern the unipolar pulse pattern *l* is obtained by full-wave rectification in the bipolar-unipolar converter 53 which latter pattern, after regeneration in the pulse regenerator 51 supplies the unipolar pulse pattern *m* which, as already explained above, must form the pulse pattern produced by the signal generator 54 in the transmiting station 37.

For that purpose, in the embodiment described the inverse code converter 59 in the transmitting station 37 which precedes the unipolar-bipolar converter 56 consists of a modulo 2 adder 60 in which the unipolar pulses of the signal generator 54 are applied to an input terminal while the outgoing unipolar pulses are applied, through a delaying network 61 having a delay time 4T, on the one hand to the unipolar-bipolar converter 56 and on the other hand to a second input terminal of the modulo 2 adder 60. The unipolar output pulses of the modulo 2 adder 60 delayed over a time 4T constitute the input pulses of the unipolar-bipolar converter 56 and are applied therein to the linear difference producer 57 on the one hand directly and on the other hand delayed over a time $T/2$ through the delaying network 58, the bipolar output pulses being formed by linear difference production, which pulses, after amplification in the output amplifier 55, are applied to the first cable section.

The transformation of the unipolar pulse pattern to the signal generator 54 in the transmitting station 37 into the outgoing bipolar pulse pattern will now be described in greater detail with reference to the time diagrams shown in FIG. 6.

It has already been described above in the time diagrams of FIG. 5, how the bipolar pulse pattern *a* at the output of the transmitting station 37 when transmitted by the transmission system of FIG. 4 ultimately passes into the unipolar pulse pattern *m* at the reproduction device 52 in the receiving station 38. As may appear from the time diagrams of FIG. 6, this bipolar pulse pattern *a* has been obtained by linear difference production of the unipolar pulse pattern *n* and the unipolar pulse pattern *o* obtained therefrom by delaying over a time $T/2$. The outgoing pulse pattern of the modulo 2 adder 60 then is the unipolar pulse pattern *p* which gives the unipolar pulse pattern *n* by delaying over a time 4T.

Figure 6:
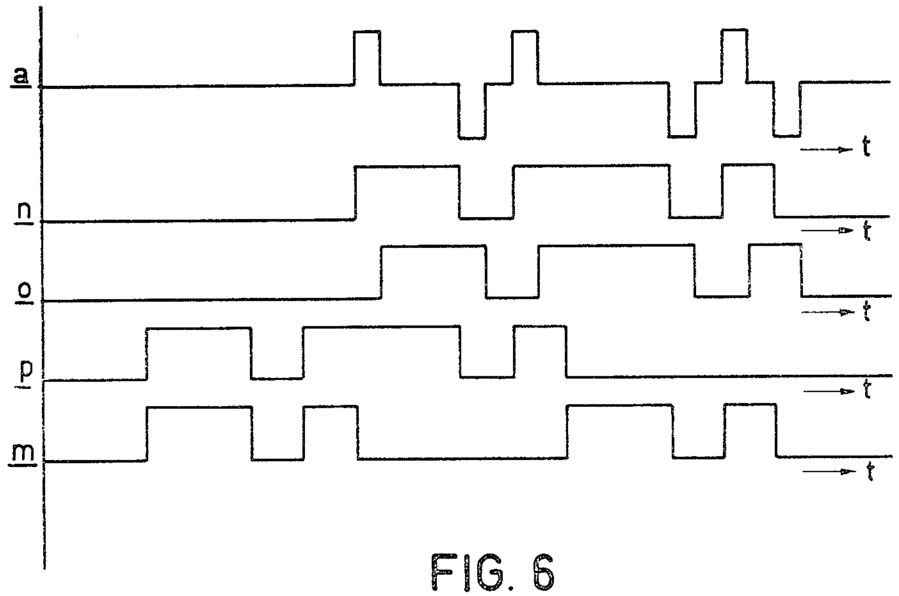

In this manner, modulo 2 addition of the unipolar pulse pattern *m* produced by the signal generator 54 and the unipolar pulse pattern *n* in the modulo 2 adder 60 must give the unipolar pulse pattern *p* which is the case indeed as appears from the time diagrams in FIG. 6. The modulo 2 adder 60 in fact supplies an output signal if of the two unipolar pulse patterns *m* and *p* at a given instant only a pulse occurs at one of the input terminals and supplies no output pulse if a pulse or no pulse is present at the two input terminals simultaneously.

Thus the inverse code converter 59 forms the pulse pattern *n* from the pulse pattern *m* produced by the signal generator 54 which pulse pattern *n* after all subsequent code conversions just supplies the pulse pattern *m* in the reproduction device 52 in the receiving station 38.

Figure 7:
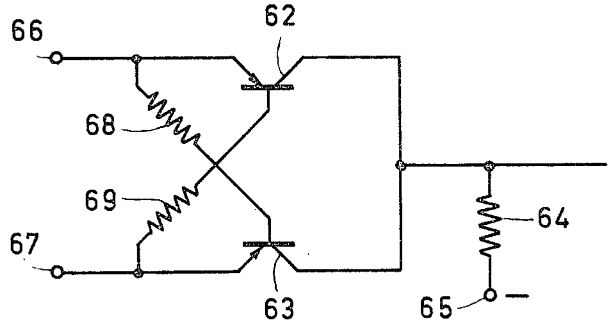
FIGURE 7 is a detailed diagram of a modulo 2 adder used in the transmission system shown in FIGURE 4.

FIG. 7 shows a detailed circuit diagram of a particularly advantageous embodiment of the modulo 2 adder.

In this embodiment the modulo 2 adder comprises two transistors 62, 63 the collector electrodes of which are connected through a common output resistor 64 to the terminal 65 of a supply voltage source, each of the two input terminals 66, 67 being connected, on the one hand directly to an emitter electrode of one of the transistors 62 and 63, respectively, and on the other hand through resistors 68 and 69, respectively, to a base electrode of the other transistors 63 and 62, respectively.

If now a pulse or no pulse simultaneously occurs in this modulo 2 adder at the two input terminals 66, 67, the voltages at the base electrode and at the emitter electrode of each of the two transistors 62, 63 are equal to one another, so that no collector current flows in any of the two transistors 62, 63 while for the case that a pulse occurs only at one of the input terminals 66 and 67, respectively, one of the two transistors 62, 63 will convey collector current so that the voltage across the output resistor 64 will increase. Thus the modulo 2 sum of the pulses applied to the input terminals 66, 67 appears at the output resistor 64.

Figure 8:
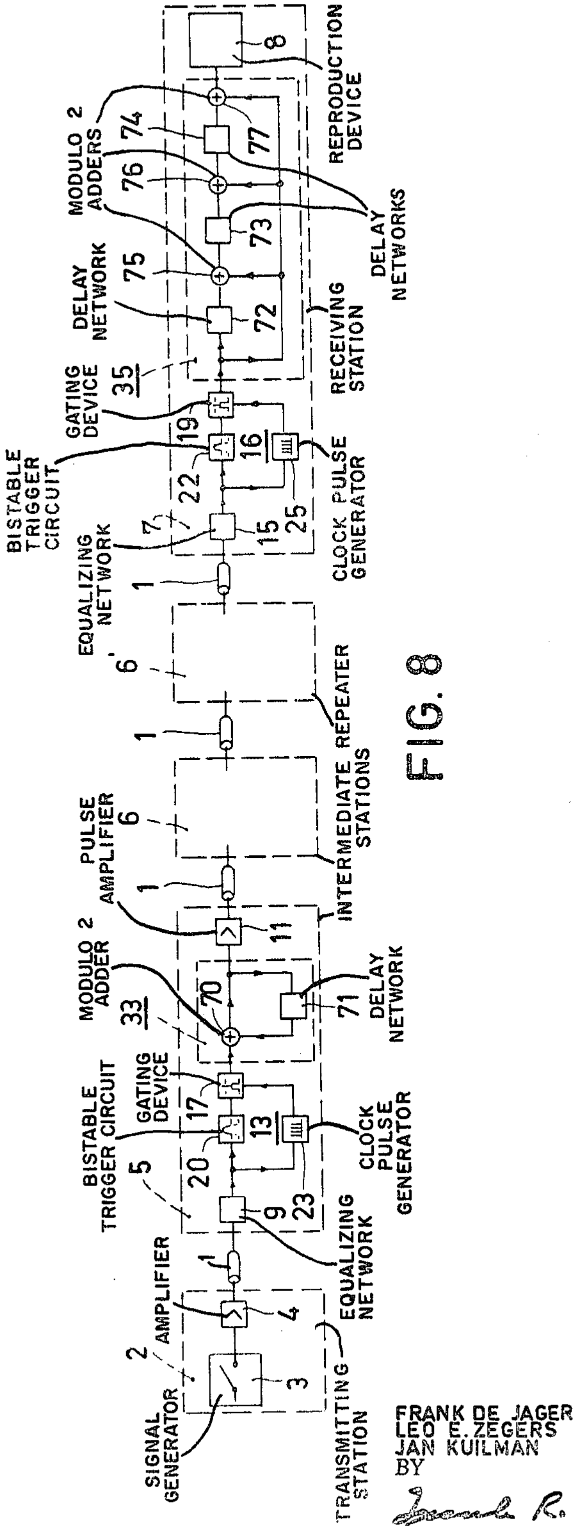
FIGURE 8 shows the transmission system shown in FIGURE 1 in greater detail.

FIG. 8 shows an example of the transmission system shown in FIG. 1 which is constructed for the transmission of information by means of pulse code modulation with unipolar pulses. Corresponding elements have been given the same reference numerals. Again for avoiding complexity of the drawing, only three similar intermediate repeater stations 5, 6, 6′ are included while the code converter 33 in the first intermediate repeater station 5 and the inverse code converter 35 in the receiving station 7 are shown in greater detail.

In the embodiment shown, the code converter 33 in the first intermediate repeater station 5 succeeding the pulse regenerator 13 comprises a modulo 2 adder 70 in which the regenerated signal pulses are applied to an input terminal, the output pulses being applied on the one hand to the pulse amplifier 11 and on the other hand, through a delaying network 71 having a delay time T, to a second input terminal of the modulo 2 adder 70. The output pulses of the modulo 2 adder 70 are applied to the next cable section after amplification in the pulse amplifier 11.

In the receiving station 7 also an inverse code converter 35 succeeding the pulse regenerator 16 is provided which comprises the cascade arrangement of three delaying networks 72, 73, 74, having a delay time T and three modulo 2 adders 75, 76, 77 in which each time a delaying network is succeeded by a modulo 2 adder, while the regenerated signal pulses are applied on the one hand to the input of the cascade arrangement and on the other hand to a second input terminal of each modulo 2 adder.

Figure 9:
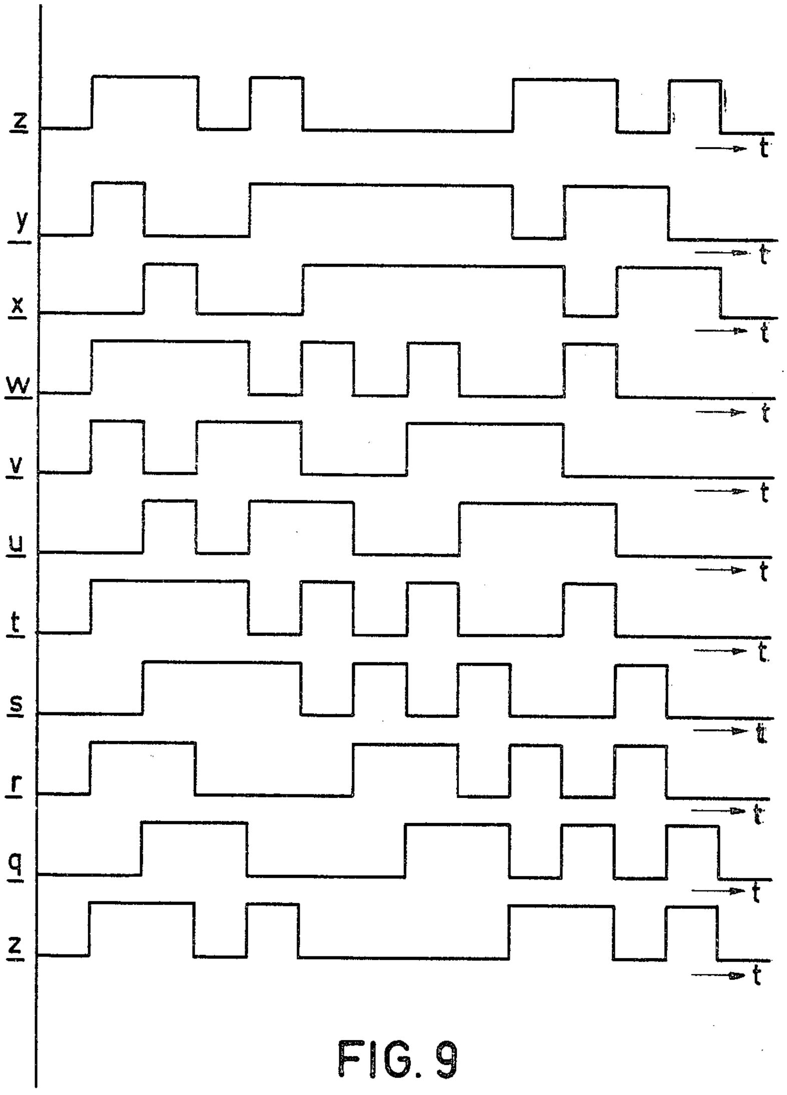
FIGURE 9 shows the associated time diagrams.

The transformations which the pulse pattern experiences during transmission will now be described in greater detail with reference to the time diagrams shown in FIG. 9 which are associated with the transmission system shown in FIG. 8.

If, for example, the signal generator 3 in the transmitting station 2 produces the pulse pattern $z$ and if said pulse pattern after amplification in the output amplifier 4 is applied to the first cable section, the same pulse pattern $z$ appears at the input of the modulo 2 adder 70 after regeneration in the pulse regenerator 13 of the first intermediate repeater station 5. At the output of the modulo 2 adder 70 the pulse pattern $y$ occurs from which, by delaying over a time T in the delaying network 71, the pulse pattern $x$ is formed which is applied to the second input terminal of the modulo 2 adder 70. Modulo 2 addition of the pulse patterns $x$ and $z$, must yield the pulse pattern $y$ which is the case indeed as appears from the time diagrams shown in FIGURE 9. After amplification in the pulse amplifier 11 the pulse pattern $y$ is applied to the second cable section.

In a similar manner the pulse pattern $w$ is formed in the second intermediate repeater station 6 by code conversion of the pulse pattern $y$ and said pulse pattern $w$ likewise is transferred by code conversion into the pulse pattern $v$ in the third intermediate repeater station 6′.

In the receiving station 7 the pulse pattern $v$ occurs after the pulse regenerator 16 from which by delaying in the first delaying network 72 over a time T the pulse pattern $u$ is formed which is applied to an input terminal of the first modulo 2 adder 75, while the pulse pattern $v$ is applied to a second input terminal of said modulo 2 adder. By modulo 2 addition of the pulse patterns $u$ and $v$, the pulse pattern $t$ is formed which, after delaying in the second delaying network 73 over a time T, yields the pulse pattern $s$ at an input terminal of the second modulo 2 adder 76 to the second input terminal of which the pulse pattern $v$ is applied. Modulo 2 addition of the pulse patterns $s$ and $v$ then yields the pulse pattern $r$ which, by delaying in the third delaying network 74 over a time T, is transferred into the pulse pattern $q$ which is applied to an input terminal of the third modulo 2 adder 77 to the second input terminal of which the pulse pattern $v$ is applied. Finally modulo 2 addition of the two pulse patterns $q$ and $v$ will have to yield the original pulse pattern $z$ which is the case indeed as appears from the time diagrams of FIG. 9.

In this manner the pulse pattern $z$ which the signal generator 3 generates in the transmitting station 2, appears to be converted into the pulse pattern $v$ by the code converters 33, . . . in the intermediate repeater stations 5, 6, 6′, from which pulse pattern exactly the original pulse pattern z is regained by means of the inverse code converter 35 in the receiving station 7.

In the two embodiments of the transmission system according to the invention shown in FIG. 4 and FIG. 8, respectively, the conversion of the pulse pattern from intermediate repeater station to intermediate repeater station is realized by code converters which are extremely simple and of equal structure, while the associated inverse code converters in one of the two terminal stations, which effect the occurrence of the pulse pattern originally produced in the transmitting station by the signal generator at the reproduction device in the receiving station, likewise are of particularly simple construction. The invention has been explained with reference to transmission systems which comprise only three intermediate repeater stations with code converters in the transmission path.

Naturally, the number of intermediate repeater stations with code converters may be extended in any arbitrary manner in which the construction of the inverse code converter has to be adapted in accordance with the number of code converters. For example, in a transmission system as shown in FIG. 4, in which the number of intermediate repeater stations with code converters is extended to N, the corresponding inverse code converter in the transmitting station will consist of the cascade arrangement of $(N+1)$ delaying networks each having a delay time T preceded by a first modulo 2 adder connected to the signal generator, while in addition between the delaying networks in the cascade arrangement modulo 2 adders are incorporated the presence of which at a given place in the cascade arrangement is determined by the number N of the intermediate repeater stations. In particular it can be proved mathematically that a modulo 2 adder is present if the expression $$\binom{N+1}{k}$$

is an odd number, in which $k=1, 2, 3, \ldots, N$ the place between the delaying network $k$ and the delaying network $(k+1)$ in the cascade arrangement. For example, in the transmission system shown in FIG. 4, $N=3$ and the expression $$\binom{N+1}{k}$$

then is for $$k=1, \binom{4}{1}=\frac{4}{1}; \text{ for } k=2, \binom{4}{2}=\frac{4.3}{1.2}=6;$$

$$\text{for } k=3, \binom{4}{3}=\frac{4.3.2}{1.2.3}=4$$

and in this case always is an even number so that entirely in agreement with the embodiment shown in FIG. 4 in the inverse code converter no further modulo 2 adders are present except the first modulo 2 adder. In another embodiment of a transmission system differing from that shown in FIG. 4 and having, for example, 5 intermediate repeater stations, the expression $\binom{N+1}{k}$ for $k=1,2,3,4,5$, successively assumes the values $$\binom{6}{1}=6, \binom{6}{2}=15; \binom{6}{3}=20; \binom{6}{4}=15; \binom{6}{5}=6$$

that is to say that in addition to the first modulo 2 adder, a modulo 2 adder is present between the 2nd and 3rd and the 4th and 5th delaying network, respectively, in the cascade arrangement. All the modulo 2 adders present are always fed also by the output pulses derived from the output of the inverse code converter.

If in a transmission system as shown in FIG. 4 the number of intermediate repeater stations N is so chosen that $(N+1)$ is an integer power of 2, the expression $$\binom{N+1}{k}$$

for $k=1, 2, 3, \ldots$ N exclusively assumes even values as a result of which a particularly simple inverse code converter is obtained in which only the first modulo 2 adder is present and all the modulo 2 adders are lacking between the delaying networks in the cascade arrangements.

Likewise, in a transmission system as shown in FIG. 8, on extending the number of intermediate repeater stations with code converter to N, the corresponding inverse code converter in the receiving station will comprise the cascade arrangement of N delaying networks each having a delay time T, succeeded by a last modulo 2 adder connected to the reproduction device, while further between the delaying networks in the cascade arrangement modulo 2 adders are incorporated, the presence of which at a given place again depends upon the number N of the intermediate repeater stations. In particular it can be proved mathematically that in this case a modulo 2 adder is present if the expression $$\binom{N}{k}$$

is an odd number, in which $k=1, 2, \ldots, N-1$ is the place between the delaying network $k$ and the delaying network $(k+1)$ in the cascade arrangement. For illustration: in the transmission system of FIG. 8, $N=3$ and the expression $$\binom{N}{k} \text{ then is for } k=1, \binom{3}{1}=\frac{3}{1}=3; \text{for } k=2, \binom{3}{2}=\frac{3.2}{1.2}=3$$

and always represents an odd number so that in the inverse code converter a modulo 2 adder succeeds each delaying network which is the case indeed in FIG. 8. For another example of a transmission system differing from that in FIG. 8 and having, for example, 9 intermediate repeater stations, the expression $\binom{N}{k}$ for $k=1,2,\ldots,8$ successively has the values $$\binom{9}{1}=9, \binom{9}{2}=36, \binom{9}{3}=84, \binom{9}{4}=126,$$

$$\binom{9}{5}=126; \binom{9}{6}=84, \binom{9}{7}=36, \binom{9}{8}=9$$

which means that in addition to the last modulo 2 adder, a modulo 2 adder is present between the 1st and 2nd and the 8th and 9th delaying network, respectively, in the cascade arrangement. All the modulo 2 adders present are always connected directly also to the input of the inverse code converter.

In this transmission system a choice of the number of intermediate repeater stations N, in which N is an integral power of 2, results in a particularly simple construction of the inverse code converter, for the expression $$\binom{N}{k}$$

then assumes for $k=1, 2, 3, \ldots, N-1$ even values exclusively so that in the inverse code converter only the last modulo 2 adder is present.

In addition it is also possible to use other delay times in the delaying networks of the code converters, for example, in the embodiment shown in FIG. 8, delaying networks having mutually equal delay times which are equal to an integer number of times the clock pulse period T; the corresponding inverse code converters must be varied in accordance with the varied delay times in the code converters.

If required, the code converters can be constructed in a more complicated manner, in which case construction of the inverse code converter in a terminal station will have to be adapted to the number and the structure of the code converters used in the intermediate repeater stations.

For completeness' sake it is noted that the clock pulse generator 26 in the pulse regenerator of FIG. 2 may also be constructed differently. For example, when using unipolar pulses in the transmission path the incoming signal pulses may be applied to a bistable trigger circuit and a differentiating network connected thereto, which output pulses, after suppression of, for example, the negative pulses, are applied to a resonance circuit tuned to the clock frequency, the output voltage of which circuit synchronizes a pulse generator of clock frequency. The clock pulse generator shown in FIG. 2 is particularly suitable for transmission systems as shown in FIG. 4 in which bipolar pulses are used in the transmission path.

What is claimed is:

1. A transmission system for transmitting information by means of pulse signals in which the pulses occur only at instants marked by a fixed clock frequency, the system comprising two terminal stations formed by a transmitting station and a receiving station, respectively, and a number of intermediate repeater stations which are located in the transmission path and are controlled by means of the fixed clock frequency regained from the incoming signal, at least one intermediate repeater station having a code converter means for converting an ingoing to the repeater station pulse pattern into a different outgoing from the repeater station pulse pattern, said code converter means comprising a modulo 2 adder to which the ingoing pulse pattern is coupled and a delaying network coupled to said outgoing pulses and said modulo 2 adder the delay time of which is equal to the clock pulse period multiplied by an integer number.

2. A transmission system as claimed in claim 1, wherein a terminal station includes an inverse code converter means for effecting that the outgoing pulse pattern in the receiving station is equal to the ingoing pulse pattern in the transmitting station.

3. A transmission system as claimed in claim 1 wherein code converters of equal construction are incorporated in all the intermediate repeater stations.

4. A transmission system as claimed in claim 1, wherein mutually equal code converters are incorporated in N intermediate repeater stations, the inverse code converter incorporated in the receiving station comprises a cascade arrangement of N delaying networks each having a delay time equal to the delay time of the delaying network in the code converter, which cascade arrangement is succeeded by a modulo 2 adder which is always present, further modulo 2 adders being present between the delaying networks in the cascade arrangement if the expression $$\binom{N}{k}$$

is an odd number and $k$ is the place between the $k^{th}$ delaying network and the $(k+1)^{th}$ delaying network in the cascade arrangement, the ingoing pulse pattern of the inverse code converter being also applied to all modulo 2 adders.

5. A transmission system as claimed in claim 4, wherein the number of intermediate repeater stations N is equal to an integer power of 2 and the inverse code converter comprises the cascade arrangement of N delaying networks and a following modulo 2 adder to which also the ingoing pulse pattern of the inverse code converter is applied.

6. A transmission system as claimed in claim 1 wherein mutually equal code converters are incorporated in N intermediate repeater stations, the inverse code converter incorporated in the transmitting station comprises a cascade arrangement of N delaying networks each having a delay time equal to the delay time of the delaying network in the code converter, which cascade arrangement is preceded by a modulo 2 adder which is always present, further modulo 2 adders being present between the delaying networks in the cascade arrangement if the expression $$\binom{N}{k}$$

is an odd number and $k$ is the place between the $k^{th}$ delaying network and the $(K+1)^{th}$ delaying network in the cascade arrangement, the outgoing pulse pattern of the inverse code converter being also applied to all modulo 2 adders.

7. A transmission system as claimed in claim 6, wherein the number of intermediate repeater stations N is equal to an integer power of 2, and the inverse code converter comprises the cascade arrangement of N delaying networks and a following modulo 2 adder to which also the outgoing pulse pattern of the inverse code converter is applied.

8. A transmission system as claimed in claim 1 wherein mutually equal code converters are incorporated in N intermediate repeater stations, further comprising a full-wave rectifier device at the input of the receiving station and a linear difference producer at the output of the transmitting station, to which linear difference producer the pulse pattern is applied directly and a delaying network having a delay time equal to half the clock-pulse period coupled to said difference producer, the inverse code converter in the transmitting station comprising a cascade arrangement of $(N+1)$ delaying networks each having a delay time equal to the clock pulse period, and preceding modulo 2 adder which is always present, further modulo 2 adders being present between the delaying networks in the cascade arrangement if the expression $$\binom{N+1}{k}$$

is an odd number and $k$ is the place between the $k^{th}$ delaying network and the $(K+1)^{th}$ delaying network in the cascade arrangement, the outgoing pulse pattern of the inverse code converter being applied to all modulo 2 adders.

9. A transmission system as claimed in claim 8, wherein the number of intermediate repeater stations is N, $(N+1)$ is equal to an integer power 2, and the inverse mode converter comprises the cascade arrangement of $(N+1)$ delaying networks and a preceding modulo 2 adder to which the outgoing pulse pattern of the inverse code converter is also applied.

10. A pulse transmission system comprising a transmitting station, a receiving station and a transmission path between said transmitting and receiving stations, said path including a plurality of serial intermediate repeater stations, said transmitting station comprising a source of coded pulse signals wherein the pulses occur only at instants marked by a fixed clock frequency, said intermediate repeater stations each comprising means for producing clock pulses from the pulse signals applied thereto, means for regenerating the pulse signals applied thereto under control of said produced clock signals, means for converting the code of the regenerated pulse signals to a code different from the code of said source and the codes of all preceding intermediate repeater stations, and means for applying said converted pulse signals to said transmission path said receiver comprising means for inverting the code of the converted pulse signals applied to said receiver station from the last of said repeater stations to the code transmitted by said transmitting station, whereby the effective value of time marking fluctuations is reduced.

References Cited

UNITED STATES PATENTS

| | | | |
|---|---|---|---|
| 2,912,508 | 11/1959 | Hughes | 179—15 |
| 2,992,341 | 7/1961 | Andrews et al. | 179—15 X |
| 2,759,047 | 8/1956 | Meacham | 328—164 X |
| 3,115,586 | 12/1963 | Lucchi. | |
| 3,162,724 | 12/1964 | Ringlehaan | 178—68 |

ROBERT L. GRIFFIN, Primary Examiner

B. V. SAFOUREK, Assistant Examiner

U.S. Cl. X.R.

178—68, 70; 325—41; 340—146.1